April 3, 1934.  A. C. NELSON  1,953,497
FLUOROSCOPIC SHUTTER CONTROL MECHANISM FOR X-RAY APPARATUS
Filed Nov. 21, 1930  7 Sheets-Sheet 4

INVENTOR
A. CHAS. NELSON
BY
ATTORNEY

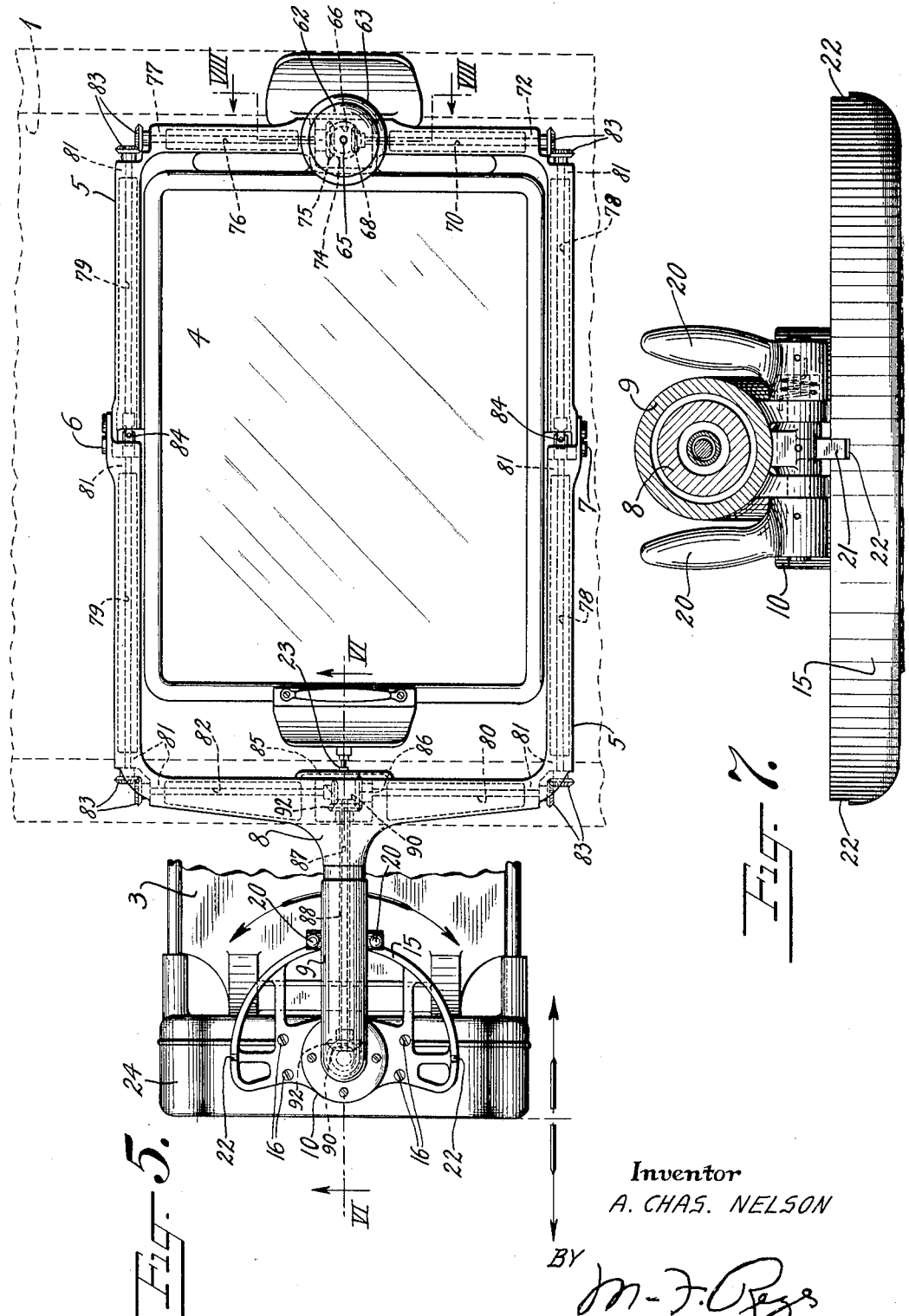

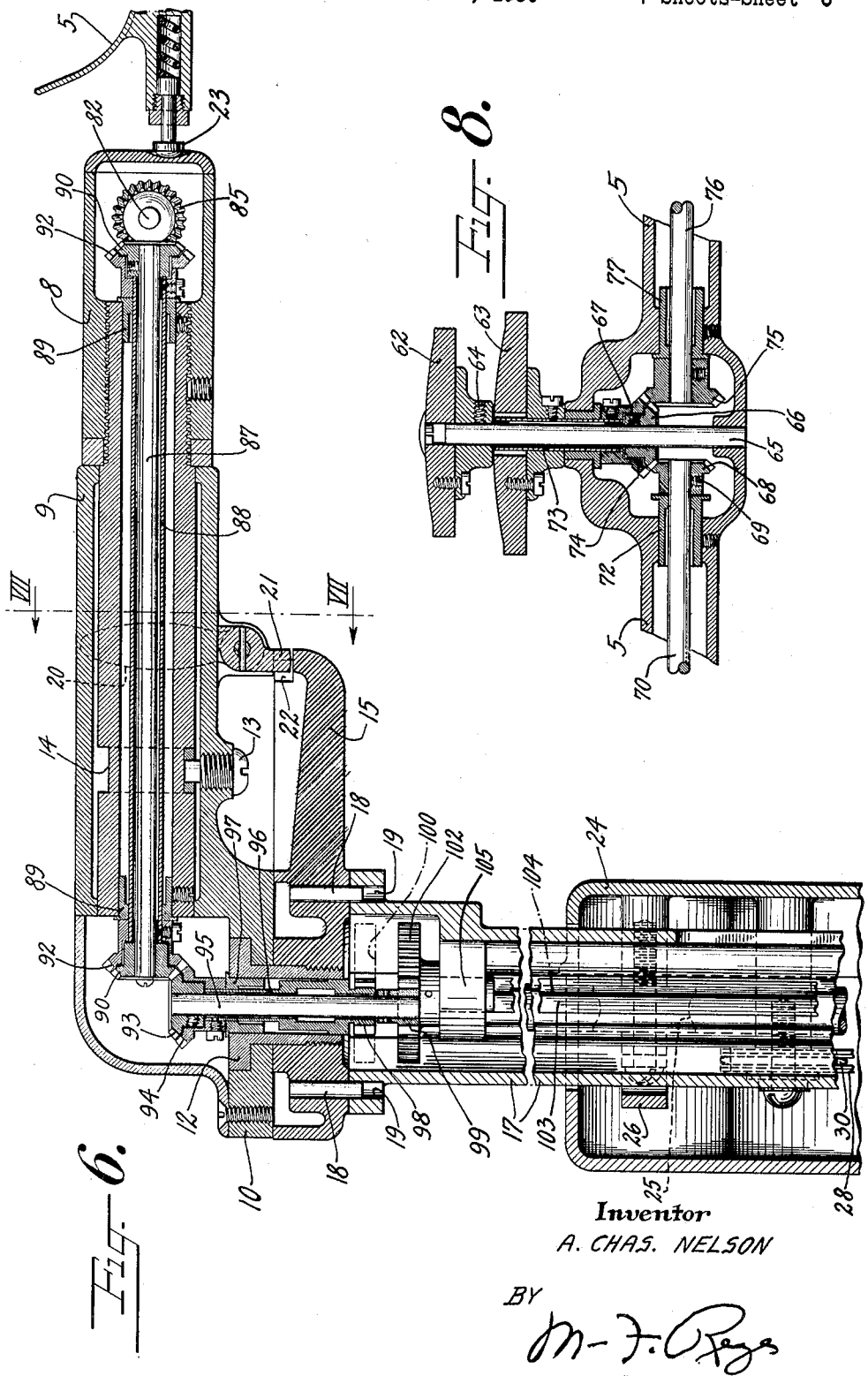

April 3, 1934.   A. C. NELSON   1,953,497
FLUOROSCOPIC SHUTTER CONTROL MECHANISM FOR X-RAY APPARATUS
Filed Nov. 21, 1930   7 Sheets-Sheet 7
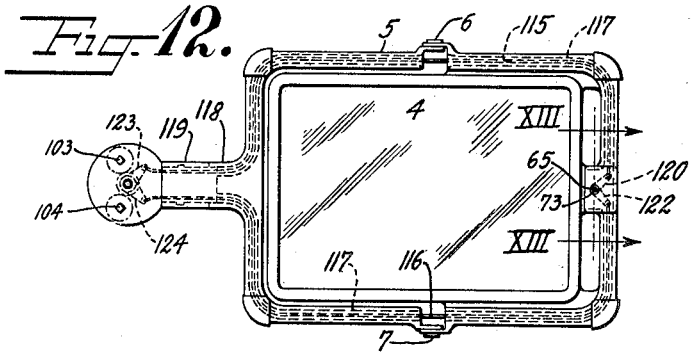
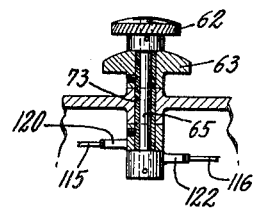
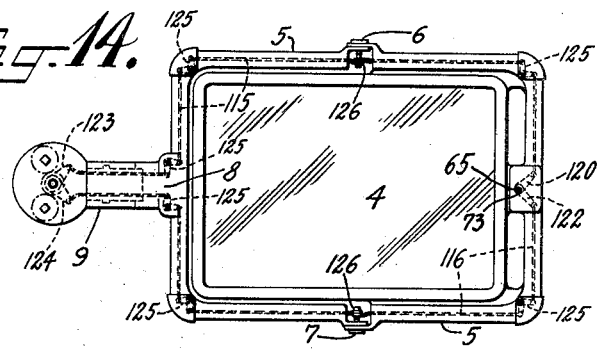
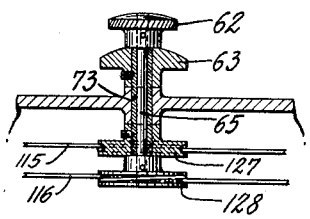
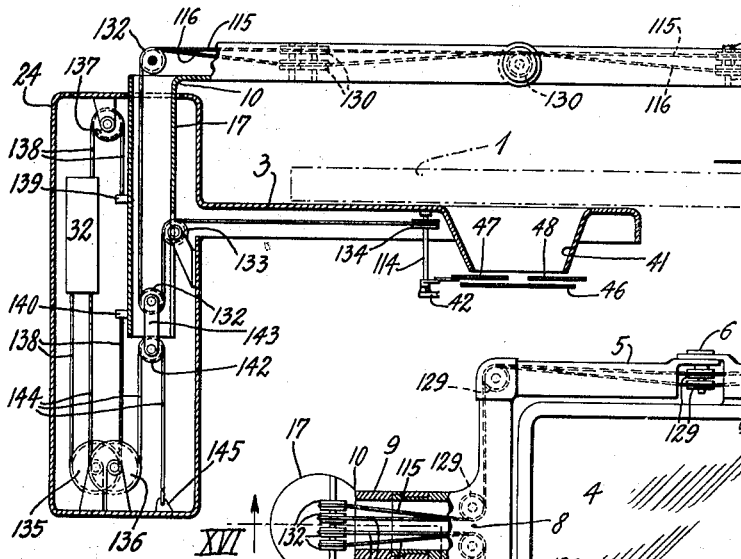
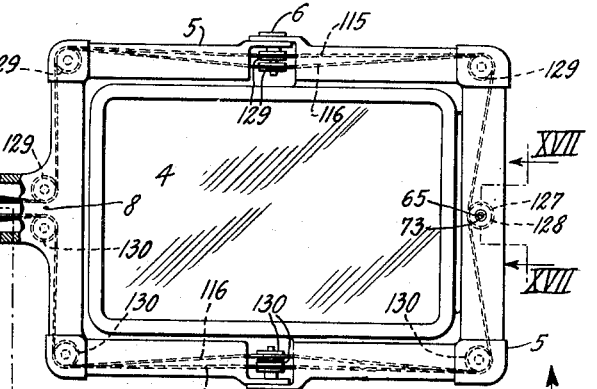
INVENTOR
A. CHAS. NELSON
BY
ATTORNEY Patented Apr. 3, 1934

1,953,497

UNITED STATES PATENT OFFICE 1,953,497

FLUOROSCOPIC SHUTTER CONTROL MECHANISM FOR X-RAY APPARATUS

Albert Charles Nelson, Flushing, N. Y., assignor, by mesne assignments, to Westinghouse X-Ray Company, Inc., a corporation of Delaware Application November 21, 1930, Serial No. 497,140

22 Claims. (Cl. 250—34)

My invention relates to X-ray apparatus and more particularly to control mechanism for the fluoroscopic shutters employed for X-ray examinations and radiographs.

Fluoroscopic units employed by the roentgenologist usually consist of an X-ray tube mounted below a table, which latter is tiltable from below a horizontal to a vertical position, a set of fluoroscopic shutters in a cone, and a fluorescent screen both being disposed above the X-ray tube, and the former above the table.

In making diagnostic examinations it is sometimes highly desirable to confine the rays emanating from the X-ray tube to a particular part of the patient's anatomy and to project only the desired part upon the fluorescent screen. A set of adjustable shutters are, therefore, usually provided and are controllable from the table to alter the size of the aperture through which the rays pass to the screen.

The controls for operating the shutters have, heretofore, been placed at some point upon the table. The fluorescent screen is usually adjustable vertically of the table and the operator must face this screen during the fluoroscopic examination. As an examination of this character must necessarily be made in the dark great difficulties are usually encountered in locating the shutter controls. The operator in groping for the controls is very apt to disturb the patient so that the position of the particular portion of the patient's anatomy, upon which it is desired to concentrate the X-rays, may become altered causing great inconvenience to the operator and patient.

It is, therefore, an object of my invention to provide a shutter control mechanism that is operable from controls carried by the fluorescent screen.

Another object of my invention is the provision of a shutter control mechanism which is entirely independent of the table.

Another object of my invention is the provision of a fluorescent screen from which the fluoroscopic shutters are controlled and in which the fluorescent screen may be moved to an infinite number of angular positions without interfering with the operation of the shutters.

A further object of my invention is the provision of a fluoroscopic unit which is secured to a single carriage and in which the fluorescent screen may be readily moved to render the unit adaptable to radiography.

Still further objects of my invention will become apparent to those skilled in the art by reference to the accompanying drawings wherein:

Fig. 5 is a top plan view of my fluorescent screen;

Fig. 6 is a cross-sectional view taken on the line VI—VI of Fig. 5;

Fig. 7 is a cross-sectional view taken on the line VII—VII of Fig. 6;

Fig. 8 is a cross-sectional view taken on the line VIII—VIII of Fig. 5;

Fig. 9 is a front elevation of the fluorescent screen showing various angular positions thereof;

Fig. 10 is a side elevational view of my fluorescent screen showing various other angular positions thereof.

Fig. 12 is a plan view of my fluorescent screen showing a modification of a portion of the shutter operating mechanism;

Fig. 13 is a sectional view of this modification taken on the line XIII—XIII of Fig. 12;

Fig. 14 is a plan view of my fluorescent screen showing another modification of a portion of my shutter operating mechanism;

Fig. 15 is a plan view of my fluorescent screen showing still another modification of my shutter operating mechanism;

Fig. 16 is a cross-sectional view of this modification taken on the line XVI—XVI of Fig. 15 and Fig. 17 is a cross-sectional view of this same modification taken on the line XVII—XVII of Fig. 15.

Figure 1:
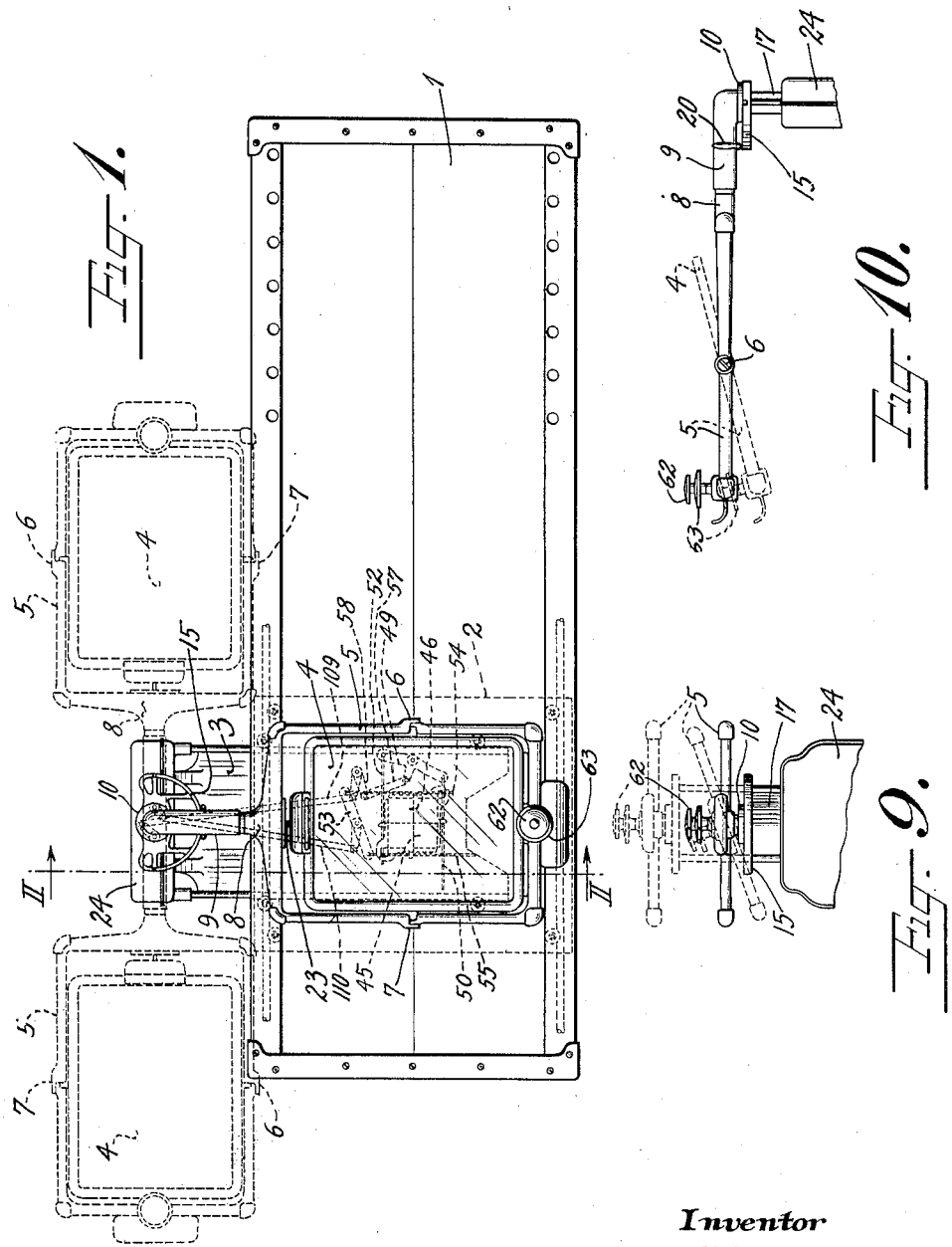
Fig. 1 is a top plan view of a table to which my fluoroscopic unit is attached showing various horizontal positions of the fluorescent screen.
Figure 2:
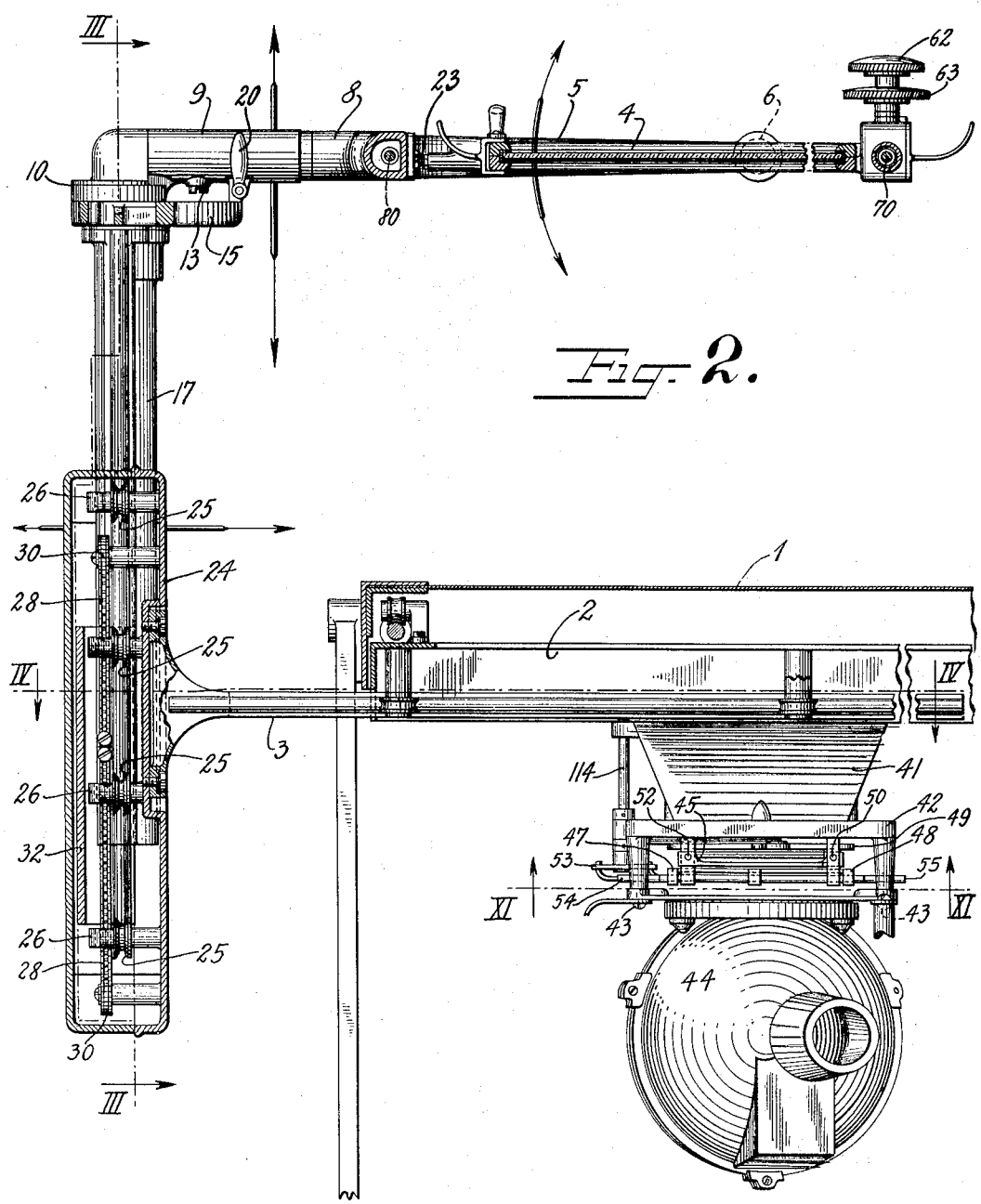
Fig. 2 is an end sectional view of my fluoroscopic unit taken on the line II—II of Fig. 1.
Figure 3:
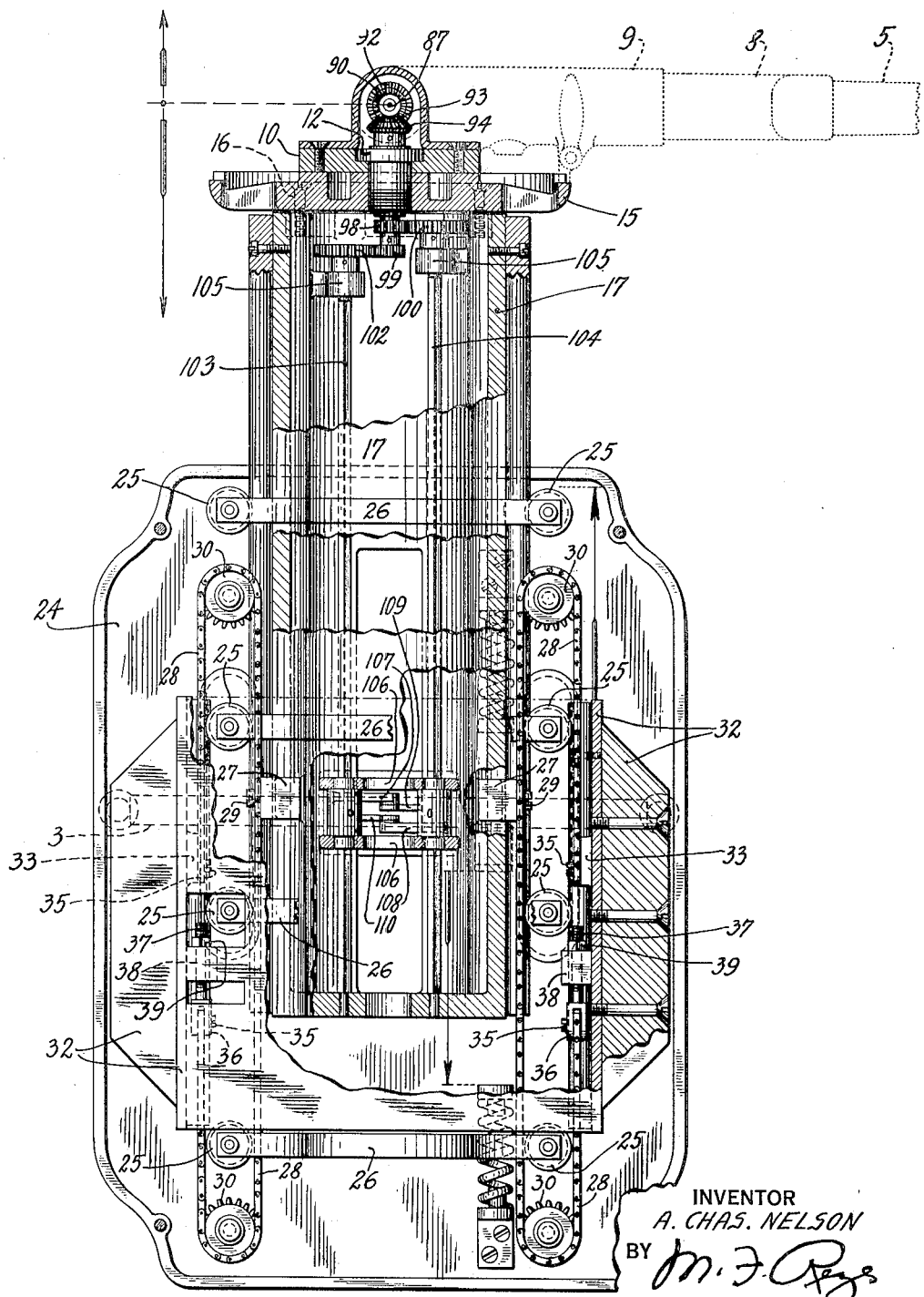
Fig. 3 is a rear view of a part of my fluoroscopic unit taken on the line III—III of Fig. 2 with a portion of the apparatus broken away to better illustrate the mechanism.
Figure 4:
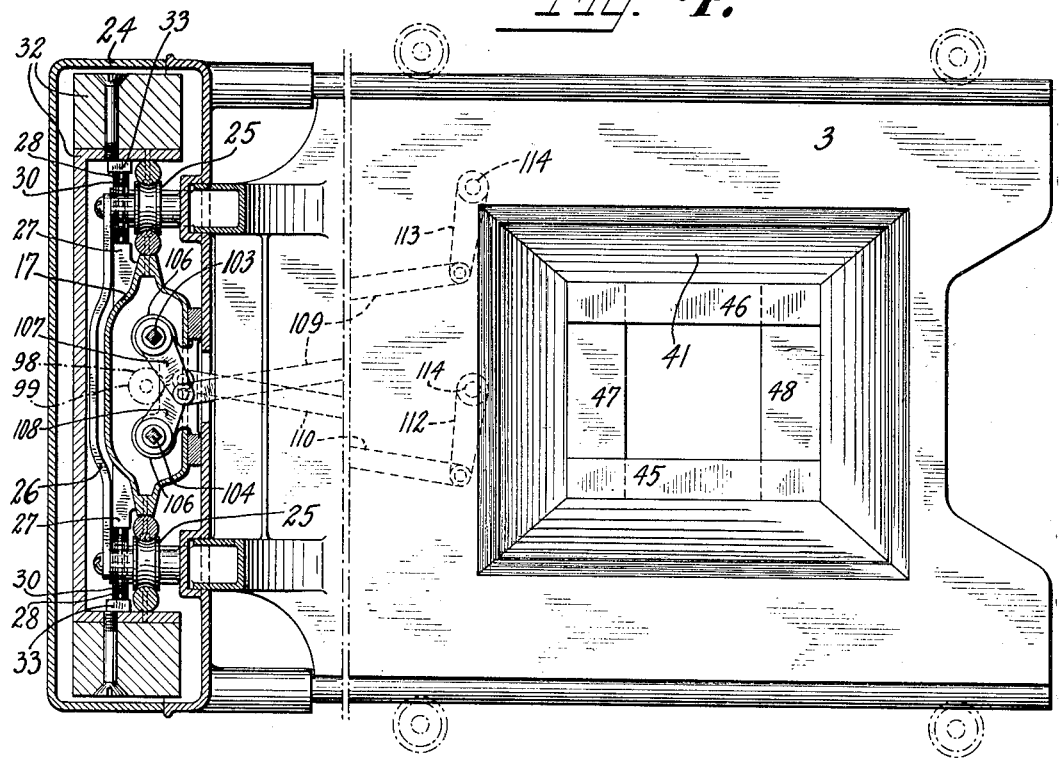
Fig. 4 is a top plan view partly in cross-section of a portion of my fluoroscopic unit on an enlarged scale taken on the line IV—IV of Fig. 2.

Referring now to the drawings in detail I have shown in Fig. 1 a table top 1 carrying a carriage 2 adapted to move longitudinally the entire length of the table top. This carriage encases a cassette tray for taking radiographic pictures and a "Bucky" diaphragm grid which is readily movable out of the fluoroscopic field when desired. (The tray and grid not being shown.)

The details of this carriage and the operation thereof, in conjunction with a tilt table, are fully shown and described in my pending application filed November 28, 1930 Serial No. 498,589, and further detailed description herein is deemed unnecessary as it forms no part of my present invention.

A support 3 is adapted to move transversely of the carriage 2 and supports an X-ray tube below the table top and a fluorescent screen 4 above the table top. This screen is positioned within a hollow frame 5 and is secured rigidly to a portion only of the frame to allow longitudinal angular movement of the screen. The frame 5 is pivoted at 6 and 7 to permit rotation about these pivots within certain limits as shown in Fig. 10.

The frame has a hollow extension 8 concentric with a tubular member 9 and forms an axis at this connection, about which the frame and screen may be completely rotated as shown in Fig. 9. The tubular member 9 is secured to a base member 10, which is journaled in a suitable bearing 12, to allow rotation of the frame and screen in a horizontal plane as illustrated in Fig. 1.

A set screw 13 projects above the base member 10 and engages with a peripheral groove 14 in the frame extension to prevent disengagement of this member and the tubular member 9.

A quadrant 15 is fastened, by means of screws 16, to a vertically movable support 17. Dowel pins 18 project downwardly from this quadrant into recesses 19 in the support member 17 to prevent rotation of the quadrant. Handles 20, placed on each side of the tubular member 9, operate a detent 21 adapted to engage notches 22 in the quadrant and maintain the screen and frame in the desired horizontal position. A spring pressed plunger 23 retains the screen 4 in a horizontal position relative to the frame 5.

A casing 24 is provided with a plurality of rollers 25 and straps 26 extend between each pair of these rollers. The support member 17 has rounded edges which are arranged to pass through the rollers 25 and straps 26 thus forming a raceway for the support member. Lugs 27 extend laterally from the support member 17 and a pair of link chains 28 are secured to the lugs by means of screws 29. These chains are arranged to pass around sprocket gears 30 positioned near the upper and lower ends of the casing 24.

A counter-weight 32, having rounded edges adapted to engage the rollers 25, is housed within the casing and lugs 33 extend laterally from this counter-weight, to which one end of the chains 28 are fastened, by screws 35. The other end of the chains are secured, by means of similar screws 35, to depending lugs 36. These latter lugs are provided with threaded stems 37 which pass through fixed brackets 38 carried by the counter-weight.

Nuts 39 are arranged to screw upon the stems 37 for the purpose of adjusting the tension of the chains 28. This construction causes a relative movement of the counter-weight whenever the vertical support member 17 is raised or lowered.

The transversely movable support member 3, which carries my entire fluoroscopic unit, carries a pair of coil springs 40 to absorb the shock when the support is moved to either edge of the table, which is its limit of travel. A rectangular cone 41, having a fixed opening and downwardly converging flanges, is suspended through an opening provided in the transversely movable support member 3. A frame member 42 is secured to the cone 41, by means of screws 43, and an X-ray tube encased in a ray opaque housing 44 is secured to the frame member. The housing 44 is provided with a window pervious to X-rays disposed in alignment with the lower aperture of the cone 41.

Figure 11:
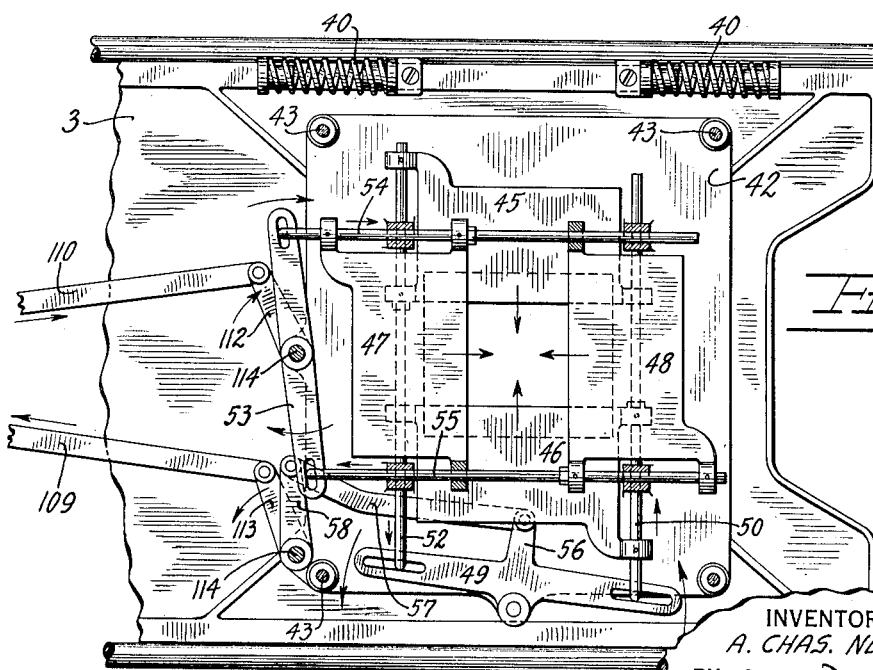
Fig. 11 is a diagrammatical plan view of the shutter mechanism taken on the line XI—XI of Fig. 2.

In order to alter the aperture, through which the rays emanating through the casing window will pass to the screen 4, a set of fluoroscopic shutters is provided. These shutters are positioned between the casing window and the lower aperture of the cone and are secured to the frame member 42. Referring more particularly to Fig. 11 the shutters comprise a pair of rectangular plates 45 and 46 of ray opaque material such as lead. A second pair of similar plates 47 and 48 overlap the first pair and are positioned at right angles thereto.

A bar or link 49 is pivoted to the frame member 42 and is provided with slots at each end. These slots are engaged by rods 50 and 52 which are in turn connected to the plates 45 and 46 respectively. A second pivoted bar 53, similar to the bar 49 but at right angles thereto, is connected to the plates 47 and 48 by rods 54 and 55. A laterally extending lug 56 is fastened to the bar 49 and a link 57 is pivotally connected to this lug and to a lever 58. The bar 53 is rigidly secured to a vertical shaft 114 in such a manner, that rotation of the shaft rocks this bar 53.

By this arrangement movement of the bar 49 about its pivot will cause a relative movement of the shutter plates 45 and 46, toward or away from each other, depending upon the direction the bar is rotated by the lever 58. In the same manner, the rotation of the vertical shaft 114 will cause a rotation of the bar 53, moving the shutter plates 47 and 48 in either direction of movement. The levers 58 and the vertical shaft 114 are actuated by means of a mechanism now about to be described.

The screen frame 5 is provided with two concentric control knobs 62 and 63. The knob 62 is rigidly fastened, by means of a set screw 64, to a vertical shaft 65 journaled in the lower portion of the hollow frame member. A pinion gear 66 is secured to the shaft 65, by a set screw 67, and meshes with a pinion gear 68. This latter pinion gear is in turn secured, by a set screw 69, to a shaft 70 which is maintained concentrically of the hollow frame 5 by bearings 72.

The control knob 63 is similarly secured to a tubular shaft 73 which also carries a pinion gear 74. The gear 74 is provided with a recess portion in which the gear 66 is adapted to freely rotate when moved by the knob 62. The larger pinion gear 74 has a diameter greater than that of gear 66 and consequently does not engage the gear 68 but meshes with a corresponding size pinion gear 75. The pinion gear 75 is in turn secured to a shaft 76 held concentric with the frame 5 by a bearing 77, this latter shaft being disposed in another section of the frame at an angle of 180° from the shaft 70.

The respective shafts 70 and 76 extend laterally of the frame member to each corner thereof and are there arranged to rotate longitudinally extending shafts 78 and 79 respectively, concentric with the frame. These longitudinal shafts 78 and 79 are adapted to rotate two more lateral shafts 80 and 82 also concentric with the hollow frame. The respective shafts are connected at the various corners of the frame member by pinion gears 83, all of which are similar, and are maintained concentric with the frame by bearings 81. The longitudinal shafts 78 and 79 have universal joints 84, at the pivot points 6 and 7, to permit rotation of a portion of the frame without interfering with the rotation of these shafts.

The laterally extending shafts 80 and 82 have secured thereto pinion gears 85 and 86, one of which is of smaller diameter than the other at the point of the hollow extension 8. A shaft 87, surrounded by a hollow shaft 88, is disposed within the hollow extension 8 and the tubular member 9.

It is to be noted that the gears 85 and 86, carried by lateral shafts 80 and 82, are opposite to the gears 68 and 75, carried by lateral shafts 79 and 76, relative to the corresponding shafts. This permits the shafts 87 and 88 to be rotated at the same speed by the respective control knobs 63 and 64.

These two concentric shafts 87 and 88 are journaled in suitable bearings 89 and each end of both shafts are provided with pinion gears 90 and 92. The pinion gears 90, being secured to the interior shaft 87, are of smaller diameter and are recessed within the outer pinion gears 92 secured to the shaft 88. The small gear 85 meshes with one of the small gears 90 and drives the shaft 87 while the larger gear 86 being in engagement with one of the larger gears 92 will rotate the shaft 88.

The other pair of pinion gears 90 and 92 are arranged to engage similar pinion gears 93 and 94. These latter gears are secured to two concentric vertical shafts 95 and 96 journaled in a suitable bearing 97. The lower end of the vertical shafts 95 and 96 carry a set of gears 98 and 99 which are arranged to rotate a further set of gears 100 and 102. These latter gears are secured to square shafts 103 and 104 which are journaled in suitable bearings 105 in the support member 17.

The transversely movable support member 3 has a pair of projecting shoulders 106 extending into an opening in the vertical support 17. These shoulders have suitable openings through which the square shafts 103 and 104 loosely pass, thus constituting guides for these shafts. Each shaft has a lever arm 107 and 108 positioned between the shoulders 106, and a square opening therein permits the shafts to pass loosely through these arms.

The vertical support member 17, carrying the square shafts 103 and 104, may be raised or lowered without destroying the driving connection between the shafts and the lever arms 107 and 108. The levers remain fixed relative to the transverse support member 3 and the shafts slide through the levers and shoulders 106.

Link bars 109 and 110 are pivotally connected to the lever arms 107 and 108 and extend longitudinally through the transversely movable support 3. These link bars are pivotally connected to lever arms 112 and 113, carried by a pair of vertical shafts 114 which extend downwardly from the support 3 and are journaled in the frame member 42. The lower end of one of these vertical shafts 114 carries the lever arm 58 which is connected to the shutters in the manner hereinbefore described. The lower end of the other vertical shaft 114 is rigidly secured to the bar 53 in the manner hereinbefore described.

Referring now more particularly to Fig. 12 I have shown a modification of my shutter control mechanism wherein flexible shafts or steel cables 115 and 116 are utilized instead of gears and shafts. A small tubing 117 is disposed internally of the hollow frame 5 which serves as a raceway for the cables. This tubing is broken at the pivot points 6 and 7 to allow the frame to be rotated in place of utilizing the universal joints 84. A collar 118 is provided, at the point of engagement of the hollow extension 8 and tubular member 9, and is adapted to join the tubing 117.

This collar rotates in a larger tubing 119 and permits the screen 4 and frame 5 to rotate as shown in Fig. 9. The concentric control knobs 62 and 63 are provided with lever arms 120 and 122, to which the flexible cables 115 and 116 are connected, instead of the gears 66, 68, 74 and 75. The two vertical concentric shafts 95 and 96 are likewise provided with lever arms 123 and 124, instead of gears 93 and 94. The flexible cables 115 and 116 are continuous between these lever arms 123 and 124 to the levers 120 and 122. In all other respects the remainder of my control mechanism is identical with that previously described.

In Fig. 14 I have shown another modification of my device which differs from that shown in Fig. 12 only in the substitution of pivoted bell crank levers 125 at the four corners of the frame and at the point of the hollow extension 8. In this embodiment the wire rods, flexible cables, or shafts 115 and 116 are not continuous between the levers 120, 122 and 123, 124 but interconnect the various bell cranks. The flexible cables are further provided with swivel joints 126 at the pivot points 6 and 7 of the frame 5.

I have shown in Fig. 15 still another modification of my control mechanism. I herein utilize flexible cables similar to those just described but which are in the form of a continuous loop from the control knobs 62 and 63 to the vertical shutter operating shaft 114. The concentric control knobs 62 and 63 are arranged to rotate two pulleys 127 and 128. Co-axial pulleys 129 and 130 are positioned at the four corners of the frame 5 and at the pivot points 6 and 7 of the frame.

Two pairs of similar co-axial pulleys are positioned at the hollow extension 8 and at the connection of the tubular member 9 to the base 10. Four co-axial pulleys 132 are rotatably positioned in a yoke located in the interior of the vertical support 17 near the bottom thereof, and four similar pulleys 133 are secured to the transversely movable support 3.

The vertical shafts 114, which extend downwardly from the support member 3 to the frame 42 and control the shutters through the lever arm 58 and pivoted bar 53, each have a pulley 134 secured thereto. The cables 115 and 116 are looped around the pulleys 127 and 128, carried by the control knobs 62 and 63, and pass over one of the various co-axial pulleys just described, to the pulleys 134. The cables being continuous pass around these pulleys 134 and thence over the various corresponding co-axial pulleys back to the control knob pulleys 127 and 128.

This structure permits the control knob pulleys, due to the looped arrangement of the cables, to rotate the pulleys 134, shafts 114 and lever arm 58 thus moving the shutters. The positioning of the co-axial pulleys 132 in a yoke near the bottom of the vertical support member 17 furnishes sufficient cable to allow this support to be raised or lowered, in the same manner, as square shafts 103 and 104 permit such movement in the modifications just described.

In this embodiment of my invention I have illustrated another counter-balancing structure for the vertical support 17. The casing 24 is provided with a pair of pulleys or sheaves 135 and 136 secured to the bottom and a similar sheave 137 secured to the top of the casing.

A cable 138 connects to a lug 139 projecting from the support member 17 and passes around the sheave 137 to the counter-weight 32. A similar cable extends from a lower lug 140, carried by the support member 17, and passes through one of the lower sheaves 135 to the counter-weight. A sheave 142 is suspended from a yoke 143, which carries the co-axial pulleys 132. A cable 144 is fastened to a rigid eyelet 145 and passes from this eyelet through the sheaves 142 and 136 to the counter-weight. This permits the counter-weight to tension the control cables 115 and 116.

The operation of my shutter control mechanism may best be understood from a given problem. Assuming the shutters are in the position shown in Fig. 11 and it is desired to decrease the size of the aperture therein formed, in order to decrease the size of the image upon the fluorescent screen 4. The operator will turn the control knobs 62 and 63 in the proper direction desired. The operation of both the knobs 62 and 63 being identical in every respect for the sake of simplicity one only will be described.

Rotation of the control knob 62 rotates the shaft 65 and gear 66. This gear being in mesh with the gear 68, carried by the lateral shaft 70, will rotate this latter gear and shaft. The lateral shaft 70 will rotate the longitudinal shaft 78 through the pinion gears 83 at the corner of the frame 5. The similar gears 83, at the opposite end of the longitudinal shaft 78, rotates the lateral shaft 80. The lateral shaft 80 carries the large gear 86, which is in engagement with the outer gear 92 secured to the hollow shaft 88, and thus rotates this gear and shaft.

The hollow shaft 88 has the gear 92, at its other end, which rotates the gear 94 and vertical hollow shaft 96. This shaft carries the gear 98, which is in driving connection with the gear 100, secured to the square shaft 104 and the square shaft is accordingly rotated. The square shaft in rotating moves the lever arm 108, the link bar 110 and lever arm 112 carried by vertical shaft 114. The rotation of the shaft rocks the bar 53 about its pivot.

Rotation of the bar 53 about its pivot pushes on the rod 54, connected to the shutter plate 47, and pulls on the rod 55, connected to the shutter plate 48. The shutter plates will thus be drawn toward each other to narrow the spacing therebetween as desired. In the same manner movement of the control knob 63 will rotate the bar 49, through its respective gearing, shafts and lever arms to move the shutter plates 45 and 46 toward each other.

The frame 5 may be rotated completely around at the axis formed by the concentric engagement of the hollow extension 8 and the tubular member 9 without in any way effecting the control mechanism. The gears 85 and 86 will rotate around the gears 90 and 92 without moving the latter or disengaging their connection. The universal joints 84 likewise permit a rotation of the frame within fixed limits about the pivot points 6 and 7.

It therefore becomes apparent to those skilled in the art that I have provided a novel fluoroscopic unit in which the fluoroscopic shutters are controlled from the fluorescent screen, in such a manner, that the controls are always accessible to the operator and operable from any one of the infinite number of angular positions of the fluorescent screen. The control mechanism is entirely independent of the table and the necessity for the operator to grope for the controls is obviated.

Although I have shown and described several embodiments of my invention I do not desire to be limited thereto as various other modifications of the same may be made without departing from the spirit and scope of the appended claims.

What is claimed is:

1. In an X-ray device the combination of a frame member rotatable in a horizontal plane and about a horizontal axis to various angular positions, a fluorescent screen connected to said frame member and movable therewith to angular positions of the latter and said fluorescent screen being further movable to various angular positions with respect to a portion of said frame member in addition to the movement of said frame member, adjustable fluoroscopic shutters, and controlling mechanism carried by said frame member and connected to said adjustable fluoroscopic shutters for operating the latter from any angular position of said frame member.

2. In an X-ray device, the combination of a frame member rotatable in a horizontal plane and about a horizontal axis to various angular positions, a fluorescent screen connected to said frame member and movable therewith to its various angular positions and movable to various angular positions with respect to a portion of said frame member in addition to the movements of said frame member, a set of adjustable fluoroscopic shutters, and concentric control knobs carried by said frame member and connected to said adjustable fluoroscopic shutters for operating the latter from any angular position of said frame member.

3. In an X-ray device, a table, a carriage movable transversely of said table, a set of adjustable fluoroscopic shutters supported by said carriage below said table, and a frame member having a fluorescent screen connected thereto and supported by said carriage above said table, said frame member being rotatable in a horizontal plane and about a horizontal axis to various angular positions, and controlling mechanism carried by said frame member and connected to said adjustable fluoroscopic shutters for operating the latter from any angular position of said frame member.

4. In an X-ray device, a table, a support movable perpendicular of said table and provided with a hollow frame pivoted thereto, a fluorescent screen secured to a portion of said frame, control knobs carried by said frame, a support movable transversely of said table and carrying said first mentioned support, adjustable fluoroscopic shutters secured to said last mentioned support, and means disposed internally of both said supports and said hollow pivoted frame for operating said adjustable fluoroscopic shutters and operable by said control knobs.

5. In an X-ray device, a table, a carriage movable longitudinally the length of said table, a support carried by said carriage movable transversely of said table, a set of adjustable fluoroscopic shutters carried by said support below said table, a support movable perpendicular of said table carried by said first mentioned support, a frame member provided with a fluorescent screen connected thereto and rotatable with respect to a portion of said frame member carried by said last mentioned support above said table, and means carried by said frame member and connected to said adjustable fluoroscopic shutters for operating the latter.

6. In an X-ray device, a table, a support movable transversely of said table, a set of adjustable fluoroscopic shutters secured to said support below said table, a perpendicular hollow casing secured to one end of said support, a movable support in telescopic engagement with said hollow casing, a counter-weight in said casing operably connected to said last mentioned support, a hollow swiveled frame secured to said last mentioned support having a portion adapted to rotate within certain limits, a fluorescent screen and control knobs carried by the rotatable portion of said frame, means disposed internally of said last mentioned support in slidable engagement with means carried by said transversely movable support and connected to said adjustable shutters, and means internally concentric with said frame and connecting said first mentioned means with said control knobs whereby operation of said control knobs actuates said adjustable fluoroscopic shutters.

7. In an X-ray device, a table, a hollow frame, a fluorescent screen carried by said frame, a set of adjustable fluoroscopic shutters carried by a support movable transversely of said table, concentric control knobs carried by said frame, shafting disposed internally concentric with said hollow frame, a support for said frame and screen movable perpendicularly to said first mentioned support, square shafts disposed in said perpendicular support, link members carried by said transversely movable support and connecting the square shafts to said adjustable shutters, and gearing connecting said control knobs, concentric shafts, and square shafts, to said adjustable fluoroscopic shutters for operating the latter by said control knobs.

8. In an X-ray device, a hollow pivoted frame, a fluorescent screen secured to a portion of said frame, a support for said frame and screen disposed perpendicular thereto, controls carried by said screen frame, a set of adjustable fluoroscopic shutters, a support for said shutters perpendicular to said first mentioned support, interconnected gears and shafting carried by both of said supports and connected to said adjustable shutters, and flexible cables positioned interiorly of said hollow frame member connecting said controls to said shafts and gearing for operating said adjustable fluoroscopic shutters from said fluorescent screen frame.

9. In an X-ray device, a hollow pivoted frame, a fluorescent screen secured to a portion of said frame, controls carried by said frame, a support for said screen and frame, a plurality of adjustable fluoroscopic shutters, a support for said shutters perpendicular to said first mentioned support, flexible cables arranged interiorly of said frame and both of said supports, connecting said controls to said adjustable shutters whereby operation of said controls actuates said adjustable fluoroscopic shutters.

10. In an X-ray device, a hollow pivoted frame, a fluorescent screen secured to a portion of said frame, controls carried by said frame, a support for said screen and frame, a plurality of adjustable fluoroscopic shutters, a support for said shutters perpendicular to said first mentioned support, pulleys disposed in both of said supports and said frame, a plurality of endless flexible cables extending around said pulleys and inter-connecting said controls with said adjustable fluoroscopic shutters whereby operation of said controls actuates said shutters.

11. In an X-ray device, a support, a fluorescent screen supporting frame member rotatably secured to said support for movement to various angular positions in a horizontal plane and about a horizontal axis, said frame having one section thereof pivoted to the remaining portion to enable movement of said section to various angular positions in addition to the movement of said remaining portion to its various angular positions, and a fluorescent screen carried by the pivoted section of said frame member and movable to all angular positions of both said pivoted section and the remaining portion of said frame member.

12. In an X-ray device, a support, a fluorescent screen supporting frame member rotatably secured to said support for movement to various angular positions in a horizontal plane and about a horizontal axis, said frame having one section thereof pivoted to the remaining portion to enable movement of said section to various angular positions in addition to the movement of said remaining portion to its various angular positions, a fluorescent screen carried by the pivoted section of said frame member and movable to all angular positions of both said pivoted section and the remaining portion of said frame member, adjustable fluoroscopic shutters associated with said support, and controlling mechanism connected to said adjustable fluoroscopic shutters for operating the latter.

13. In an X-ray device, a support, a fluorescent screen supporting frame member rotatably secured to said support for movement to various angular positions in a horizontal plane and about a horizontal axis, said frame having one section thereof pivoted to the remaining portion to enable movement of said section to various angular positions in addition to the movement of said remaining portion to its various angular positions, a fluorescent screen carried by the pivoted section of said frame member and movable to all angular positions of both said pivoted section and the remaining portion of said frame member, adjustable fluoroscopic shutters associated with said support, and controlling mechanism movable with said fluorescent screen and connected to said adjustable fluoroscopic shutters for controlling the movements of the latter from any angular position of said fluorescent screen.

14. In an X-ray device, a support, a fluorescent screen supporting frame member rotatably secured to said support for movement to various angular positions in a horizontal plane and about a horizontal axis, said frame having one section thereof pivoted to the remaining portion to enable movement of said section to various angular positions in addition to the movement of said remaining portion to its various angular positions, a fluorescent screen carried by the pivoted section of said frame member and movable to all angular positions of both said pivoted section and the remaining portion of said frame member, adjustable fluoroscopic shutters associated with said support, and controlling mechanism movable with the pivoted section of said frame and connected to said adjustable fluoroscopic shutters for controlling the movements of the latter from any angular position of the pivoted section of said frame member.

15. In an X-ray device, a support, a fluorescent screen supporting frame member rotatably secured to said support for movement to various angular positions in a horizontal plane and about a horizontal axis, a fluorescent screen secured to said supporting frame member and movable therewith to all its angular positions adjustable fluoroscopic shutters associated with said support, and controlling mechanism carried by said frame member following substantially the contour thereof and connected to said adjustable fluoroscopic shutters for operating the latter from any angular position of said fluorescent screen.

16. In an X-ray device, a support, a hollow frame member rotatably secured to said support for movement to various angular positions in a horizontal plane and about a horizontal axis, a fluorescent screen secured to said hollow frame member and movable therewith to all its angular positions, adjustable fluoroscopic shutters associated with said support, and control mechanism disposed internally of said hollow frame member and connected to said adjustable fluoroscopic shutters for operating the latter from any angular position of said hollow frame member.

17. In an X-ray device, a support, a fluorescent screen supporting frame rotatably secured to said support for movement to various angular positions in a horizontal plane and about a horizontal axis, a fluorescent screen carried by said frame and movable therewith to all its angular positions, adjustable fluoroscopic shutters associated with said support, and control means connected to said adjustable fluoroscopic shutters for operating the latter and rotatable about said support with said fluorescent screen.

18. In an X-ray device, a support, a fluorescent screen supporting frame member rotatably secured to said support for movement to various angular positions in a horizontal plane and about a horizontal axis, a fluorescent screen carried by said frame member, adjustable fluoroscopic shutters disposed in parallel relation to said frame member, and control means connected to said adjustable fluoroscopic shutters for operating the same, said control means being rotatable about said support in the plane of movement of said frame member.

19. In an X-ray device, the combination of a frame member rotatable in a horizontal plane and about a horizontal axis, a fluorescent screen connected to said frame member and rotatable with respect to a portion of the latter, adjustable fluoroscopic shutters, and controlling mechanism carried by said frame member and connected to said adjustable fluoroscopic shutters for operating the latter.

20. In an X-ray device, a fluoroscopic unit comprising a frame member rotatable in a horizontal plane and about a horizontal axis to various angular positions, a fluorescent screen secured to said frame member and rotatable with respect to a portion of the latter, a plurality of ray opaque adjustable fluoroscopic shutters, a ray opaque casing provided with an X-ray tube therein and a window pervious to X-rays, said window disposed in alignment with said fluorescent screen and fluoroscopic shutters, and controlling means carried by said frame member and connected to said adjustable fluoroscopic shutters for operating the latter from any angular position of said frame member.

21. In an X-ray device, a support, a fluorescent screen supporting frame rotatably secured to said support for movement to various angular positions in a horizontal plane and about a horizontal axis independently of any movement of said support, a fluorescent screen secured to said frame and rotatable with respect to a portion of said frame, adjustable fluoroscopic shutters associated with said support, and control means movable with said fluorescent screen to all angular positions of said supporting frame and connected to said adjustable fluoroscopic shutters for operating the latter.

22. In an X-ray device, a support, a hollow frame member rotatably secured to said support for movement to various angular positions in a horizontal plane and about a horizontal axis, a fluorescent screen connected to said hollow frame member and movable to various angular positions with respect to a portion of said hollow frame member in addition to the movements of said hollow frame member, to its various angular positions, adjustable fluoroscopic shutters, and control mechanism disposed internally of said hollow frame member and connected to said adjustable fluoroscopic shutters for operating the latter from any angular position of said fluorescent screen.

ALBERT CHARLES NELSON.